March 3, 1964

C. H. NICKELL 3,123,828

LAWN EDGING DEVICE

Filed Aug. 3, 1961

INVENTOR
CLAUDE H. NICKELL
BY
WILSON, SETTLE, McRAE & CRAIG

March 3, 1964      C. H. NICKELL      3,123,828
LAWN EDGING DEVICE
Filed Aug. 3, 1961      2 Sheets-Sheet 2
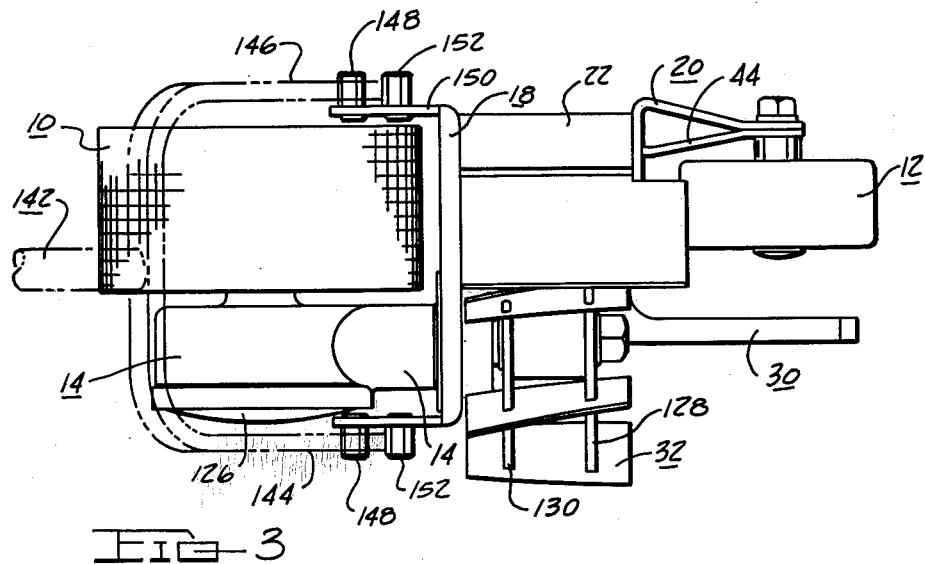
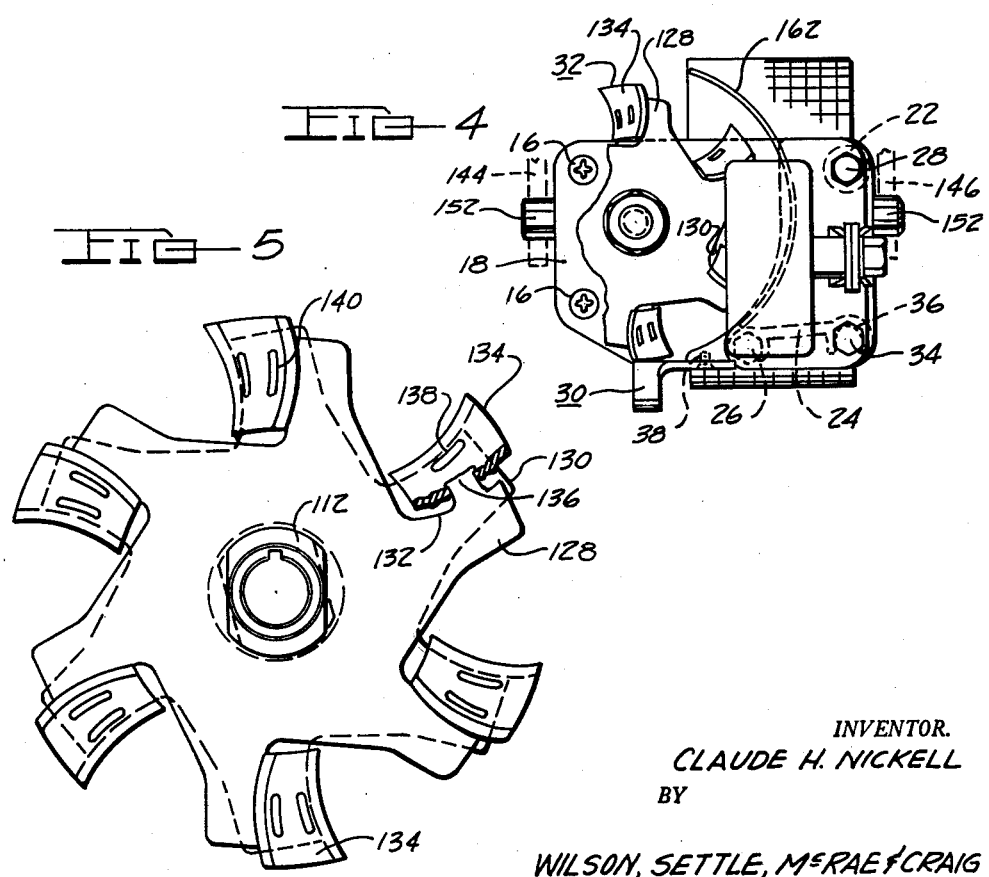
INVENTOR.
CLAUDE H. NICKELL
BY
WILSON, SETTLE, McRAE & CRAIG United States Patent Office 3,123,828
Patented Mar. 3, 1964

3,123,828
LAWN EDGING DEVICE
Claude H. Nickell, 17809 Oakwood Blvd.,
Dearborn, Mich.
Filed Aug. 3, 1961, Ser. No. 128,989
6 Claims. (Cl. 56—241)

This invention relates to lawn edging equipment and more particularly to a hand propelled grass trimming edger having longitudinally spaced wheels and wherein a multi-bladed cutter is driven through gearing connected with one of the wheels to cut the grass and other vegetation along the edge of sidewalks, driveways, curbs, etc.

Heretofore many types of hand operated and power driven edgers have been employed in an effort to make it possible for the householder to more easily maintain a neat appearance of the grass adjacent sidewalks, curbs, etc. The majority of these devices have been difficult to operate, and they have not functioned to provide a uniform cut which is necessary to insure a neat appearance of the lawn. Some of the devices designed to perform this function have embodied a single wheel operably connected to drive a cutting element. These devices have been difficult to operate because it has been virtually impossible to constantly maintain the cutting blade in proper angular relation with respect to the grass being cut.

An object of my invention is to provide an improved lawn edging tool so designed and constructed that an accurate and uniform cut of the grass may be made along the edge of any desired surface such for example as a driveway, sidewalk or curb, and wherein longitudinally spaced driving and stabilizing wheels are employed to drive cutting elements and to move them accurately along a desired path to simplify the lawn edging operation.

Another object resides in the provision of an improved lawn edger having a relatively wide driving wheel to insure adequate traction to drive a multi-bladed cutter at suitable speed relative to the forward movement of the device to insure a clean crisp cut of the grass or other vegetation being cut.

A further object is to provide an improved lawn edger for driving a multi-bladed cutter element through a gear box mechanism having therein a one-way clutch to permit positive drive of the cutter blades when the device is propelled in the forward direction, and to permit retrograde movement thereof without driving the cutting elements, thereby facilitating the use of the device in areas where space is limited.

Another object of my invention is to provide an improved lawn edger having a multi-bladed cutting element driven by a gear mechanism operably connected to a driving wheel, the gear train ratio being proportioned to the diameter of the driving wheel and with respect to the linear speed of the edging device to provide an efficient clean cut without undesirably deflecting the vertical position of the grass or other vegetation being cut.

Another object is to provide a lawn edging device having a multi-bladed cutting member wherein the individual cutting blades are angularly related to define a helical path relative to a cutter bar mounted for angular adjustability relative to the axis of the cutter blade carrying shaft.

A further object of my invention is to provide a wheeled lawn edger having a driving wheel presenting a wide tread surface adapted to engage a sidewalk, driveway, or curb and a stabilizing wheel of smaller proportions rotatable on an axis parallel in two planes to the axis of the driving wheel, the stabilizing wheel being adjustable vertically to adjust the height of a pickup probe or guide for elevating the grass and deflecting it into alignment with the cutting elements.

Still a further object of my invention resides in the provision of a pivoted handle movable angularly between extreme positions defined by a stop member, and wherein the point of thrust imparted through the handle is positioned forwardly of the driving wheel, and low relative to the horizontal plane of the front and rear wheels.

A more specific object of my invention is to provide a thrust applying member angularly movable between extreme positions, and operative to vary the vertical and longitudinal components of force exerted on the device in accordance with the angularity of the handle to insure the provision of adequate vertical force on the driving and stabilizing wheels to insure positive drive of the cutter elements to insure a good cutting action under all conditions and adequate pressure on the front wheel to insure lateral stability and vertical stability of the pick-up bar.

Another object is to provide a shield positioned along one side of a horizontally extending rotatable cutting element to serve the two-fold function of preventing injury by contact with the blades and to deflect grass or other vegetation cut by the device and throw it off of the sidewalk or other surface on which the driving and stabilizing wheels are moving and be later picked up by the regular mower.

A further object is to provide an improved lawn edger having a wheel driven cutting element and a guide element associated with a stabilizing wheel spaced forwardly of the driving wheel.

Another object of my invention resides in the provision of a novel lawn edger which may be economically manufactured to provide a sturdy long lasting edger capable of rendering satisfactory service over long periods of time and with minimum adjustments.

Other objects of this invention will appear in the following description and appended claims, reference being had to the accompanying drawings forming a part of this specification wherein like reference characters designate corresponding parts in the several views.

FIG. 3 is a top plan view of my improved device.

FIG. 4 is a front elevational view looking rearwardly as viewed in FIGS. 1 to 3.

FIG. 5 is an enlarged front elevational view, partly in section of the rotatable cutting element.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
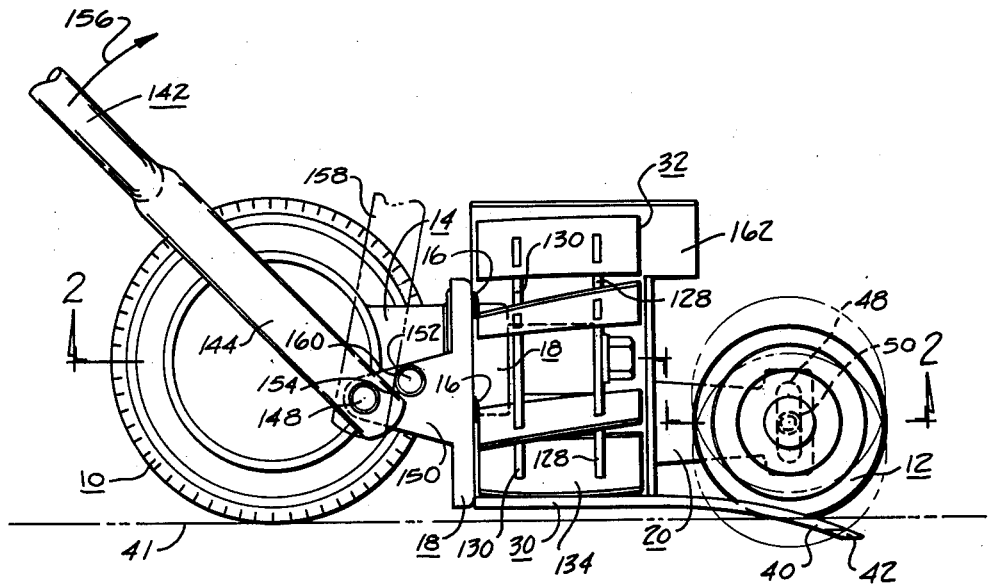
FIG. 1 is a side elevational view of a lawn edger embodying my invention.

Referring now to the drawings and more particularly to FIG. 1 thereof it will be noted that my improved lawn edging device consists of a rear driving wheel 10 and a front stabilizing wheel 12 spaced longitudinally of the driving wheel and having interposed therebetween a gear case housing 14 having suitably secured thereto as by cap screws 16 a bulkhead member or crosshead 18. The bulkhead or crosshead member 18 has a front support member 20 spaced longitudinally thereof by a stationary spacer 22 illustrated in FIG. 2, and an adjustable spacer 24 which pivots about a bolt 26 as more clearly shown in FIG. 4. The stationary spacer 22 is held in place by a bolt 28 extending through the support member 20 and the bulkhead 18.

An angularly adjustable cut-off blade, pick-up bar and guide member 30 is secured to the adjustable spacer 24 for adjustment about the bolt 26. To effect angular adjustment of the member 30 relative to a rotary cutting element 32 the bolts 34 and 26 are loosened, and the adjustable spacer 24 is pivoted about the bolt 26 to induce sliding movement of the outer end of the adjustable spacer 24 through a slot 36 on the bolt 34. When a desired adjusted position of the member 30 has been attained relative to the rotary cutting element 32, the bolts 26 and 34 are tightened to again clamp the adjustable spacer in the desired angular position. It will be noted that the adjustable cut-off blade, pick-up bar and guide 30 is carried by the adjustable spacer 24 by a plurality of screws 38 projecting upwardly through the bottom of the member 30 as illustrated in FIG. 4. If desired the member 30 may be adjusted angularly relative to the spacer 24. As shown in FIG. 1 the member 30 has a forwardly extending curved pick-up arm and guide member 40, the forward end of which is proportioned to project beneath the plane 41 defined by the engaging surfaces of the wheels 10 and 12. The forward end of the guide member 40 is preferably provided with a carbide tip 42 to insure long wear and provide a hardened working surface adapted to engage the vertical edge of a sidewalk, curb, driveway, etc. along which it is desired to cut the grass or other vegetation. It will be apparent that if desired the forward end of the member 30 defining the pick-up arm and guide member portion 40 may be formed as a separate member from the cut-off blade portion. Also, if desired the portion of the pick-up and guide portion 40 which extends beneath the plane 41 defined by the contacting surfaces of the wheels 10 and 12 may be resilient or yieldably mounted to permit movement of the device in an upright position over a flat surface.

A reinforcing arm 44 is staked or otherwise secured in a transversely extending portion 46 of the front support member 20, and converges into alignment with the front support member 20 at the front.

The front support member 20 and the forward portion of the reinforcing arm 44 have a vertically extended slot 48 as illustrated by the dotted lines on FIG. 1 for the reception of a front axle 50 adapted to be adjustably mounted on the front support member 20 and the reinforcing arm 44 between spacers 52 and 54 by means of a nut 56 threaded onto the end of the axle 50. It will be noted that the spacer 52 abuts a shoulder on the axle 50, any suitable type of bearings being provided between the axle 50 and the front stabilizing wheel 12.

Figure 2:
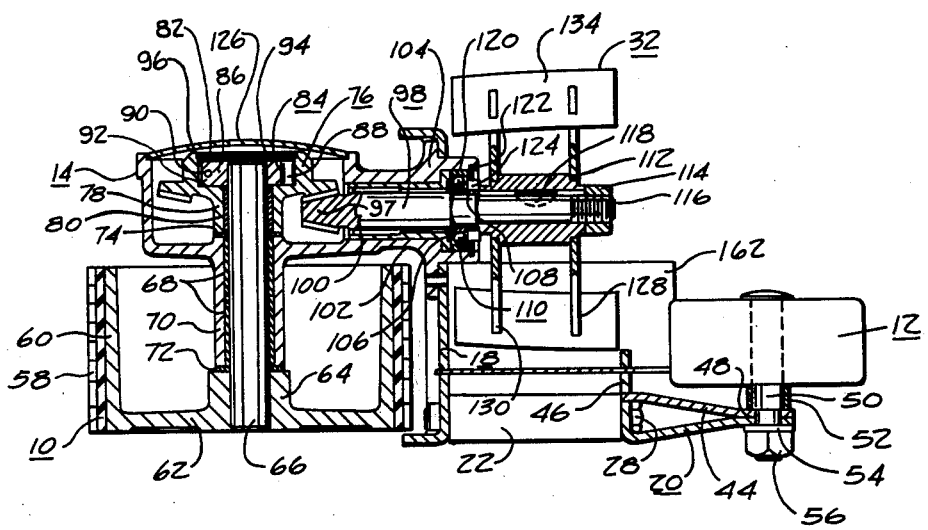
FIG. 2 is a longitudinal sectional view taken substantially on the line 2—2 of FIG. 1, looking in the direction of the arrows.

Referring now more particularly to FIG. 2 it will be noted that the rear driving wheel 10 has a non-skid driving tire 58 bonded or otherwise secured to the drum portion 60 of the wheel 10. The drum portion 60 has a radial flange 62 terminating in a hub 64 secured in any desired manner as by pressing to a shaft 66, journaled in suitable bushings or bearings 68 such for example as sintered oil impregnated bushings which do not require lubrication. The bushings 68 are suitably secured within the bore of a hub portion 70 carried by the gear case housing 14. It will be noted that a pair of suitable thrust washers or spacers 72 and 74 positioned at opposite ends of the hub portion 70 are provided to take thrust exerted on the shaft 66, and to limit the endwise travel of the shaft 66 within the hub portion 70.

A bevel drive gear 76 has a hub portion 78 journaled on a bushing 80 mounted on the shaft 66, the bushing preferably being a press fit within the hub 78, and being free to rotate on the shaft 66. The outer end of the bevel gear 76 is provided with an annular raceway 82 adapted to receive the elements of a one way clutch 84. These elements preferably consist of an inner cam member 86 secured in driving relation to the shaft 66, and having a plurality of circumferentially spaced cam surfaces to receive rollers 88 and cam members operable to permit free rotation of the bevel driving gear 76 in one direction on the shaft 66, but to insure driving engagement in the other direction. A plurality of springs 90 are employed to yieldingly urge the rollers circumferentially toward the minimum clearance position so that when the shaft 66 is moved in the driving direction relative to the bevel gear 76 the rollers 88 lock to effect a wedging or driving connection between the gear 76 and the shaft 66. It will be noted that the elements of the one way driving clutch 84 are provided with thrust washer 92 on the internal surface, and with a closure and thrust plate assembly 94 suitably secured in place by a snap ring 96 fitting within a suitable groove in the outer edge of the annular raceway 82 of the bevel drive gear 76. The one way clutch assembly may be lubricated for life at assembly, and since the bushings 68 and 80 are of the oil impregnated type they also do not require lubrication for the entire normal life of the assembly. A long lasting accurately proportioned unit is thus insured.

The bevel driving gear 76 meshes with and drives a driven pinion 97 formed on a shaft 98, preferably journaled in a roller bearing 100 mounted on a cage 102 to facilitate removal and assembly within the pinion bore 104 of the gear case housing 14. The pinion shaft 98 has a shoulder 106 against which the inner race 108 of a life time sealed bearing 110 engages. The outer end of the inner race 110 is engaged by a hub 112 of the radial cutter blade assembly 32. The outer end of the hub 112 is engaged by a nut 114 threadedly engaged to the outer end 116 of the pinion shaft 98. It will be noted that a rotational drive of the rotary cutting element 32 is insured by reason of a key 118 interposed between the hub 112 and the shaft 98.

Referring now to the bearing 110 it will be noted that the outer race 120 contacts the outer end of the cage 102 and itself is retained in axially spaced relation within the counterbore of the pinion housing portion 104 by means of a snap ring 122 to maintain the driving assembly in proper adjusted relationship. The outer end of the bearing 110 is closed by a seal 124 to close the outer end of the pinion bore 104 in fluid tight relation.

The bevel gear entrance side of the gear case housing 14 is closed by a suitable pressed plug or plate 126 whereupon it is possible to pack the gear case housing with suitable lubricant for the lifetime operation of the gear assembly.

Referring now more particularly to the drawings for the details of construction of the rotary cutting element, it will be noted that the pair of axially spaced discs 128 and 130 are secured to the hub 112, and have a plurality of cutout segments defining spaced abutments 132 to receive a plurality of cutting blades 134 to which the adjustable cut-off portion of the member 30 is adapted to be adjusted. It will be noted that the discs 128 and 130 are preferably oscillated slightly relative to each other so as to dispose the blades 134 at an angle axially to the cut-off portion of the member 30 to induce a shearing action as the cutting edge of the blades 134 pass the cut-off member thereby insuring a clean crisp cut of the grass or other vegetation being cut.

It will be noted that the abutment portions 132 of the discs 128 and 130 have projections 136 adapted to extend through slots 138 formed in the blades 134 to permit securing the assembly firmly together by peening over the ends of the projections 136 as illustrated at 140.

While any desired number of blades 134 may be employed I have found that six blades set at the approximate angle illustrated and driven by the gear ratio shown in the drawings are sufficient to insure clean and crisp cutting of the grass and other vegetation without any undesirable bending or pulling on the grass which would loosen the roots in the earth.

Referring now to FIGS. 1, 3 and 4 it will be noted that a handle 142 which may be of any desired type has a forked lower end defining spaced sections 144 and 146 pivotally mounted on a pair of spaced projections 148 carried by rearwardly extended portions 150 on opposite sides of the bulkhead member 18.

A second pair of projections 152 also carried by the portions 150 of the bulkhead member 18 are so spaced as to provide a stop to limit travel of the handle sections 144 and 146 in opposite directions as illustrated in FIG. 1.

It will be noted that forward thrust to drive my improved lawn edger is applied through the handle 142 and is exerted through the sections 144 and 146 beneath the horizontal center line plane between the driving and stabilizing wheels 10 and 12 respectively. By exerting the thrust into the device beneath the axes of the wheels and closely adjacent but forwardly of the rear or driving wheel a sufficient vertical load is imposed on the rear wheel to induce adequate traction of the tire 58 on the surface of the sidewalk, driveway, curb, etc. over which the device is being propelled to insure positive driving of the cutter elements 32 to provide a clean and crisp cut.

The angular relation of the handle 142 can be varied to change the proportion of force exerted to increase the vertical loading of the driving wheel 10 and the forward thrust imparted to move the device forwardly.

The handle 142 is movable angularly about the projections 148 between an angularly depressed position defined by contact of the portions 154 of the handle sections 144 and 146 beyond their pivoted connection on the projections 148 with the edge of the projections 152. In this position the minimum downward force is exerted on the driving wheel 10 and the maximum forward thrust is exerted to drive the device forwardly. The handle 142 is movable angularly in the clockwise direction as shown by the arrow 156 on FIG. 1 to the parking position shown at 158 in dash-dot lines on FIG. 1. It will be apparent that in the parked position the portions 160 of the handle sections 144 and 146 short of their pivoted connections on the projections 146 engage the projections 152 to limit angular movement of the handle 142.

As the handle 142 oscillates from the position shown in full lines toward the position shown in dash dot lines the vertical loading on the driving wheel 10 progressively increases, and the forward thrust progressively decreases, until the handle reaches the vertical position in which no forward thrust is exerted on the device. When the handle 142 is in the dash dot position 158, the portion 160 of the handle segments 144 and 146 engage the projections 152 carried by the rearwardly extending portions 150 of the bulkhead member 18, in this position the device will remain in an upright or park position, the wide area of the tire 58 of the driving wheel 10, and the flat area of the stabilizing wheel 12 providing adequate support to hold the device in the upright position.

The operation is as follows. When it is desired to edge or trim the grass along the edge of a sidewalk, driveway, etc. indicated by the line 41 in FIG. 1, the pick-up and guide portion 40 of the member 30 is positioned in contact with the vertical edge of the sidewalk, curb or other member along which the grass is to be edged. The carbide tip 42 carried at the forward end of the pick-up portion 40 is hard and will insure a long wearing characteristic since it will not be readily worn away by abrading contact with the concrete or other walk forming material against which it is moved.

The downwardly angled end portion of the pick-up probe 40 will lift the grass or other vegetation along the edge of the driveway or other surface being edged, and will guide it to slide along the pick-up member 40 and cut-off blade 30 to be presented along the edge of the cut-off blade 30 at an appropriate angle to be sheared off by the blades 134 as they are driven past the edge of the cut-off blade 30.

As previously stated the diameter of the driving wheel 10, the ratio of the gears 76 and 97 and the number of cut-off blades 134 employed in the element 32 are proportioned in cooperation with the longitudinally angulated configuration of the cut-off blades 134 relative to the cut-off member 30 to insure a smooth, clean cut of the grass or other vegetation being cut without undesirably pulling or bending the blades of the grass.

It will be noted that the depth of the forward end of the pick-up probe 40 may be varied relative to the surface of the sidewalk, curb, driveway, etc. 41 by loosening the nut 56 holding the front stabilizing wheel 12 in adjusted position and moving it vertically within the slot 48 of the support member 20 to dispose the forward end of the pick-up probe 40 at a desired depth, and to position the cut-off blade 30 at a suitable distance above the surface 41 of the sidewalk, etc. to insure a desirable edging operation.

An arcuately shaped guide member 162 is preferably carried by bulkhead member 18 to receive grass and other vegetation cut by the rotary cutting element 32 and to deflect it back onto the grass adjacent the sidewalk or other surface being edged, thereby throwing it clear of the surface of the sidewalk or other surface over which the device is moved to prevent the grass from being crushed under the driving wheel 10, and to eliminate the need for sweeping the sidewalk or other surface after the edging operation has been performed. This has the additional advantage in that if the edging operation is performed before the lawn is mowed, the cuttings from the lawn edging operation are thrown back onto the lawn and are gathered up or cut for diffusion into the lawn at the time the lawn is mowed.

By referring to FIGS. 2, 3 and 4 it will be noted that the cut-off blade 30, which defines the line along which grass will be cut is offset laterally from the driving wheel 10 and the stabilizing wheel 12. It is thus possible to maintain the wheels 10 and 12 on the surface of the sidewalk, curb, driveway, etc. to insure good driving and guiding traction whereupon an efficient job of edging the grass may be accomplished.

While a particular form of my improved lawn edger has been shown in detail herein it will be understood that various changes may be made therein without departing from the spirit of my invention as defined by the following claims.

I claim:

1. A lawn edger comprising a housing, a drive wheel supporting one end of said housing, a stabilizing wheel supporting the opposite end of said housing, a rotary cutting element mounted on said housing and drivingly connected to said drive wheel, an operating handle connected to said housing intermediate the axes of rotation of said drive wheel and said stabilizing wheel and below a plane extending through said axes, whereby downward thrust on said handle will be distributed between the drive and stabilizing wheels and forward thrust will cause rotation of the drive wheel to drive said cutting element.

2. The structure of claim 1 in which said stabilizing wheel is adjustable.

3. The structure of claim 1 including clutch means disposed intermediate said drive wheel and said cutting element.

4. The structure of claim 1 in which said operating handle is rotatably connected to said housing.

5. The structure of claim 4 including stop means to limit the movement of said handle.

6. The structure of claim 1 in which said drive wheel and said stabilizing wheel are substantially in longitudinal alignment and said cutting element is laterally offset therefrom.

References Cited in the file of this patent

UNITED STATES PATENTS

| | | |
|---|---|---|
| 2,650,463 | Courson et al. | Sept. 1, 1953 |
| 2,685,774 | Williams | Aug. 10, 1954 |
| 2,782,587 | Ott | Feb. 26, 1957 |
| 2,934,875 | Katzfey | May 3, 1960 |